(12) United States Patent
Sheehan

(10) Patent No.: US 9,718,144 B2
(45) Date of Patent: Aug. 1, 2017

(54) HIGH BANDWIDTH LARGE SURFACE AREA ULTRASONIC BLOCK HORN

(71) Applicant: Branson Ultrasonics Corporation, Danbury, CT (US)

(72) Inventor: James F. Sheehan, Wilmington, MA (US)

(73) Assignee: Branson Ultrasonics Corporation, Danbury, CT (US)

( * ) Notice: Subject to any disclaimer, the term of this patent is extended or adjusted under 35 U.S.C. 154(b) by 232 days.

(21) Appl. No.: 14/733,163

(22) Filed: Jun. 8, 2015

(65) Prior Publication Data

US 2015/0352662 A1    Dec. 10, 2015

Related U.S. Application Data

(60) Provisional application No. 62/009,431, filed on Jun. 9, 2014.

(51) Int. Cl.
| B23K 1/06 | (2006.01) |
| B23K 20/10 | (2006.01) |
| B06B 3/00 | (2006.01) |
| B29C 65/08 | (2006.01) |

(52) U.S. Cl.
CPC .............. B23K 20/106 (2013.01); B06B 3/00 (2013.01); B29C 65/085 (2013.01)

(58) Field of Classification Search
CPC .......... B06B 1/02; B29C 65/08; B23K 20/106
See application file for complete search history.

(56) References Cited

U.S. PATENT DOCUMENTS

| 2,723,386 | A | * | 11/1955 | Camp | ...................... | B06B 3/00 |
| | | | | | | 310/26 |
| 3,370,186 | A | * | 2/1968 | Antonevich | .......... | B06B 1/0618 |
| | | | | | | 134/1 |
| 4,131,505 | A | * | 12/1978 | Davis, Jr. | .................. | B06B 3/00 |
| | | | | | | 156/580.1 |
| 4,582,239 | A | * | 4/1986 | Scotto | .................. | B23K 20/106 |
| | | | | | | 156/580.2 |
| 5,095,188 | A | * | 3/1992 | Klein | ........................ | B06B 3/00 |
| | | | | | | 219/121.14 |
| 5,645,681 | A | * | 7/1997 | Gopalakrishna | ...... | B29C 65/085 |
| | | | | | | 156/580.2 |
| 5,730,351 | A | * | 3/1998 | Hermann | .................. | B06B 3/00 |
| | | | | | | 156/580.1 |
| 5,922,170 | A | * | 7/1999 | Gerdes | .................... | B29C 65/08 |
| | | | | | | 156/580.1 |

(Continued)

FOREIGN PATENT DOCUMENTS

| EP | 2353737 A1 | 8/2011 |
| WO | WO-20130105361 A1 | 7/2013 |

OTHER PUBLICATIONS

Notification of Transmittal of the International Search Report and the Written Opinion of the International Searching Authority, mailed Oct. 22, 2015.

*Primary Examiner* — Erin Saad
*Assistant Examiner* — Carlos Gamino
(74) *Attorney, Agent, or Firm* — Harness, Dickey & Pierce, P.L.C.

(57) ABSTRACT

A large surface area ultrasonic block horn includes one or more shaped elements having a node at a mid-point of the shaped element that is narrower than opposed ends of the shaped element.

17 Claims, 4 Drawing Sheets

(56) References Cited

U.S. PATENT DOCUMENTS

| | | | | |
|---|---|---|---|---|
| 6,153,964 | A * | 11/2000 | Olsson | B06B 3/00 156/580.1 |
| 6,173,878 | B1 * | 1/2001 | Stroh | B23K 20/106 228/1.1 |
| 6,605,178 | B1 * | 8/2003 | Shinohara | B29C 65/08 156/379.6 |
| 6,626,349 | B2 * | 9/2003 | Janin | B06B 3/00 156/580.2 |
| 6,811,630 | B2 * | 11/2004 | Tominaga | B06B 3/00 156/580.1 |
| 6,966,969 | B2 * | 11/2005 | Moulin | B06B 3/00 156/580.1 |
| 7,004,282 | B2 * | 2/2006 | Manna | B06B 3/00 181/142 |
| 7,156,201 | B2 * | 1/2007 | Peshkovskiy | B06B 3/00 181/175 |
| 9,449,595 | B2 * | 9/2016 | Zendler | |
| 2010/0206487 | A1 | 8/2010 | Arai et al. | |
| 2014/0000460 | A1 * | 1/2014 | Buttiker | B06B 3/04 96/175 |
| 2015/0210003 | A1 * | 7/2015 | Short | B23K 20/106 156/73.1 |

\* cited by examiner

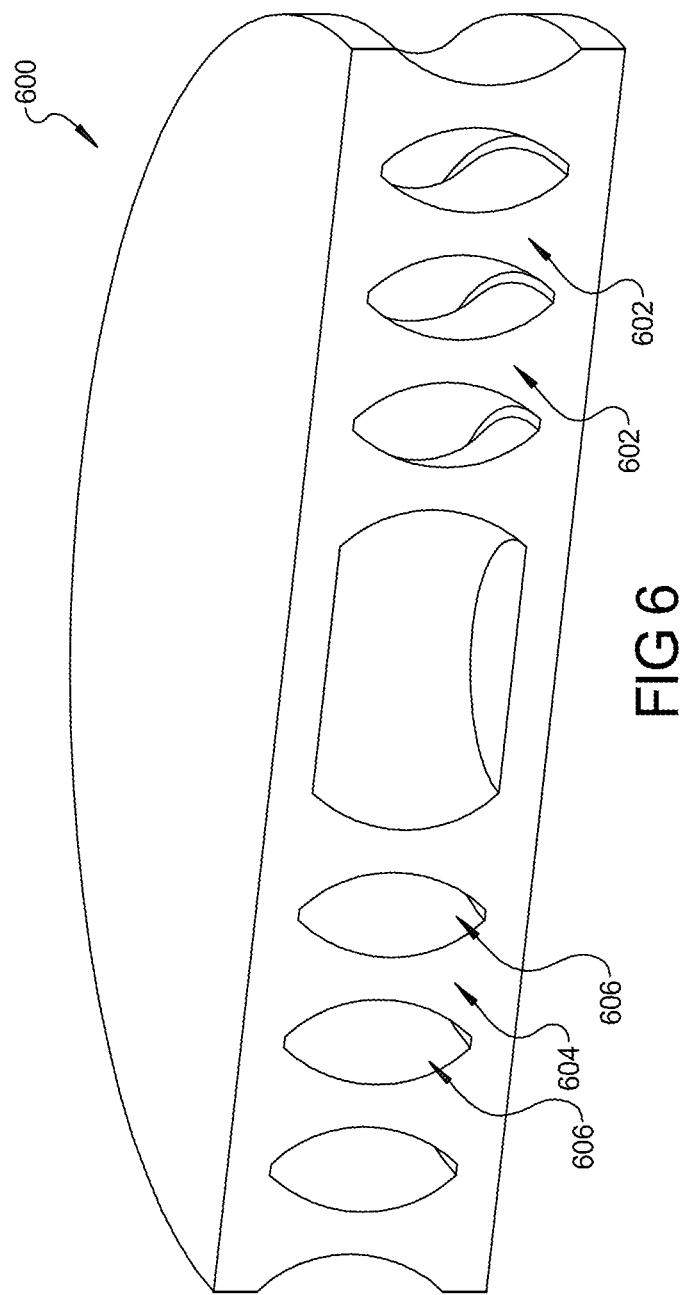

HIGH BANDWIDTH LARGE SURFACE AREA ULTRASONIC BLOCK HORN

CROSS-REFERENCE TO RELATED APPLICATIONS

This application claims the benefit of U.S. Provisional Application No. 62/009431, filed on Jun. 9, 2014. The entire disclosure of the above application is incorporated herein by reference.

FIELD

The present disclosure relates to ultrasonic welders, and more particularly, to a high bandwidth ultrasonic horn for ultrasonic welders.

BACKGROUND

This section provides background information related to the present disclosure which is not necessarily prior art.

A model of a typical prior art ultrasonic metal welding apparatus 100 is shown in FIG. 1. Typical components of ultrasonic metal welding apparatus 100 include an ultrasonic transducer 102, a booster 104, and an ultrasonic horn 106. The ultrasonic transducer 102, booster 104 and ultrasonic horn 106 comprise weld stack 118. It should be understood that in some cases, weld stack 118 does not have booster 104. Electrical energy from a power supply 101 at a frequency of 20-60 kHz is converted to mechanical energy by the ultrasonic transducer 102. The mechanical energy converted in the ultrasonic transducer 102 is transmitted to a weld load 108 (such as two pieces of metal 112, 114) through the booster 104 and the horn 106. The booster 104 and the horn 106 perform the functions of transmitting the mechanical energy as well as transforming mechanical vibrations from the ultrasonic transducer 102 by a gain factor.

The mechanical vibration that results on a horn tip 110 is the motion that performs the task of welding metal together. Horn tip 110 may be made of tungsten carbide or other high strength, hard material. The metal pieces 112, 114 to be welded together are placed adjacent to the horn tip 110. The horn tip 110 is brought into contact with top metal piece 112 to be welded. The axial vibrations of the ultrasonic horn 106 now become shear vibrations to the top metal piece 112. The shear vibrations are transmitted to the top metal piece 112, causing it to move back and forth with respect to bottom metal piece 114 causing surfaces of the two metal pieces abutting each other at a weld interface to be heated, eventually melting together. A weld anvil 120 grounds the bottom metal piece 114. It should be understood that such an ultrasonic welder can be used to weld multiple metal foil layers together, such as several layers of aluminum or copper foil.

A similar apparatus is used in ultrasonically welding plastic pieces together. The principal difference is that the ultrasonic horn oscillates in a manner to impart vertical oscillations in the plastic pieces. That is, the ultrasonic horn causes oscillatory compression/decompression of the plastic pieces with respect to each other causing surfaces of the plastic pieces abutting each other at a weld interface to be heated, eventually melting together.

Ultrasonic welders are for example disclosed in U.S. Pat. No. 5,658,408 for Method for Processing Workpieces by Ultrasonic Energy;" U.S. Pat. No. 6,863,205 for Anti-Splice Welder," and US Pat. Pub. No. 2008/0054051 for "Ultrasonic Welding Using Amplitude Profiling." The entire disclosures of the foregoing are incorporated herein by reference.

One type of ultrasonic horn is sometimes referred to as a slotted ultrasonic block horn. This type of ultrasonic horn is made of a block of metal, such as steel, aluminum or titanium, with slots machined in it between the top and bottom surfaces. Typical slotted ultrasonic block horns resonant at ultrasonic frequencies typically used in ultrasonic welders (e.g., 15 kHz-60 kHz) have higher than desired quality ("Q") factors. Q factor is the resonant frequency of the ultrasonic horn divided by the bandwidth of the ultrasonic horn. The higher the Q factor, the narrower the bandwidth and vice-versa. Using ultrasonic horns with these high quality factors lead to ultrasonic stacks that have very low bandwidth. Low bandwidth ultrasonic stacks are problematic for ultrasonic power supplies to track and maintain axial resonance during typical weld cycles. This can result in overloads of the ultrasonic power supplies due to the difficulties in tuning and tracking the resonant frequency.

SUMMARY

This section provides a general summary of the disclosure, and is not a comprehensive disclosure of its full scope or all of its features.

In accordance with an aspect of the present disclosure, a large surface area ultrasonic block horn includes one or more shaped elements having a node at a mid-point of the shaped element that is narrower than opposed ends of the shaped element.

In an aspect, each shaped element is symmetrical about its node.

In an aspect, the ultrasonic block horn has a length or width that is at least one-half a wavelength of a nominal resonant frequency of an ultrasonic stack in which the ultrasonic block horn is intended to be used.

In an aspect, the shaped element has a ratio of (A)/(a) of at least two where (A) is a weld area of the shaped element and (a) is a cross-sectional area of the node wherein the weld area of the shaped element is an area of a base of the shaped element that is adjacent a booster of an ultrasonic stack when the ultrasonic block horn is attached to the booster.

In an aspect, the shaped element is shaped as back-to-back pyramids joined together at truncated apexes. In an aspect, the shaped element is cylindrically shaped having a diameter at a node at a mid-point between opposed ends that is narrower than a diameter of its opposed ends.

In an aspect, the ultrasonic block horn has an array of the shaped elements. In an aspect, the array of shaped elements is a 3×3 array. In an aspect, the array of shaped elements is a 4×4 array.

In an aspect, the ultrasonic block horn is rectangular. In an aspect, the ultrasonic block horn is cylindrical.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is cross-section of a cylindrical high bandwidth large surface area slotted ultrasonic block horn having a plurality of shaped elements in accordance with an aspect of the present disclosure.

Corresponding reference numerals indicate corresponding parts throughout the several views of the drawings.

DETAILED DESCRIPTION

Figure 1:
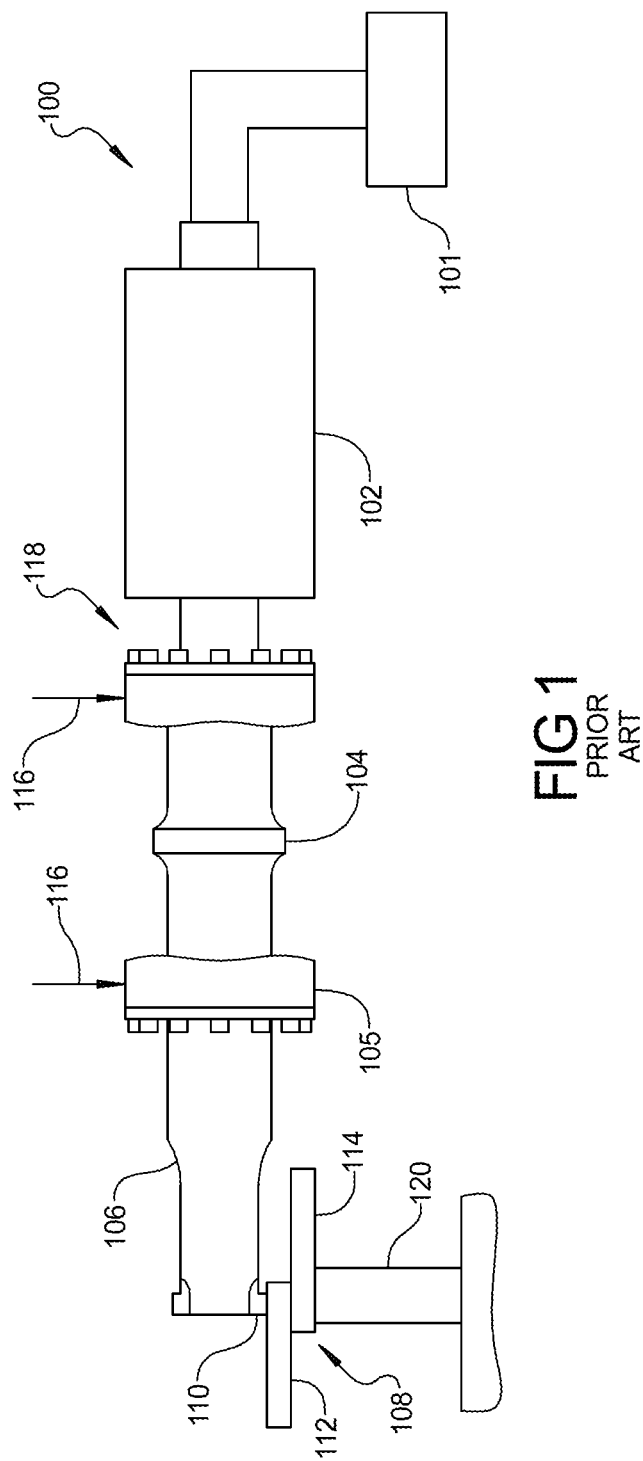
FIG. 1 is schematic view of a prior art ultrasonic welder.

Example embodiments will now be described more fully with reference to the accompanying drawings.

In accordance with an aspect of the present disclosure, a large surface area ultrasonic block horn includes one or more shaped elements having a node at a mid-point of the shaped element that is narrower than opposed ends of the shaped element. "Large surface area" in this context means that the ultrasonic block horn has a length or width equal to or greater than ½ the nominal resonant frequency of the ultrasonic stack in which the ultrasonic block horn is intended to be used. The mid-point of the shaped element is the point that is equidistant from the opposed ends. The areas of the opposed ends are thus larger than an area of the node, which is the cross-sectional area of shaped element at the mid-point. In an aspect, the shaped element is symmetrical about the node. That is, halves of the shaped element on either side of the node are symmetrical. In an aspect, when the large surface area block ultrasonic horn has a plurality of the shaped elements, the shaped elements all have the same geometry and dimensions. The shaped element (or elements as the case may be) is tuned to the ultrasonic stack frequency that it is intended to be used in (such as 20 kHz, 30 Khz, 40 kHz, 50 kHz or 60 kHz). The shaped elements can be combined in various configurations to form large surface area slotted ultrasonic block horns having larger surface areas.

A large surface area slotted ultrasonic block horn formed of a plurality of the above described shaped elements achieves high bandwidth when used in a typical ultrasonic stack as it provides the ultrasonic stack with a higher coupling coefficient (Keff) compared to existing large surface area ultrasonic horns. The higher Keff is achieved due to lower strain energy being needed for the large surface area ultrasonic block horn to operate a given ultrasonic frequency.

Consider an ultrasonic system that runs at parallel resonance and uses series tuning. The tuning bandwidth of such a system is given by:

$$(B) \text{Bandwidth} = K_{\text{eff}} * f_p$$

where Keff is the coupling coefficient of the complete ultrasonic stack (converter, booster, horn) and fp is the resonance frequency of the stack. For a system that runs with this tuning technique, it is much easier to operate a system with a large bandwidth than with a small one (as is known in the art). A large surface area ultrasonic block horn formed with a plurality of the above described shaped elements provides the ultrasonic stack with a higher Keff than existing large surface area ultrasonic horns having the same weld area.

In accordance with an aspect of the present disclosure, the shaped element has a ratio of (A)/(a) of at least 2 where (A) is the weld area of the shaped element and (a) is the cross-sectional area at the node at the mid-point of the shaped element. The weld area of the shaped element is the area of the opposed end of the shaped element that is adjacent the booster of the ultrasonic stack when the ultrasonic horn having the shaped element is attached to the booster. This is described in more detail below with reference to the example of a shaped element shown in FIG. 2.

Figure 2:
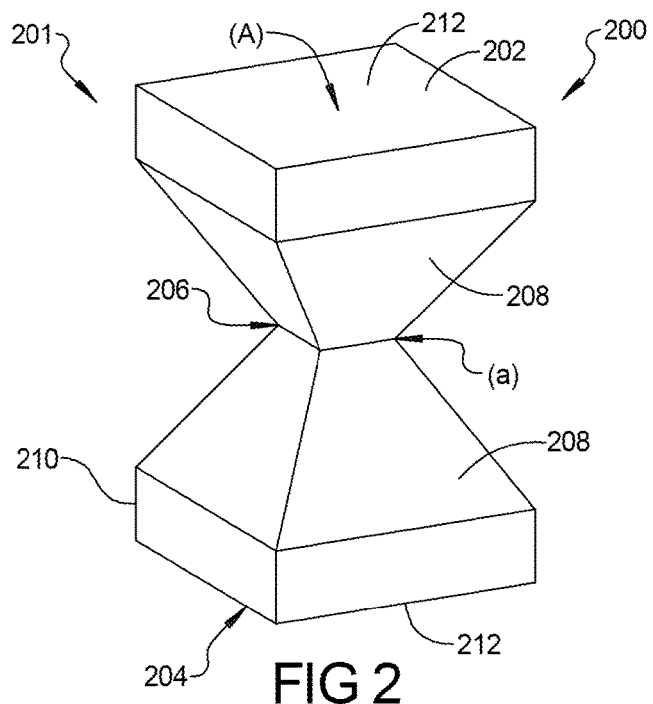
FIG. 2 is a perspective view of a shaped element for a high bandwidth large surface area slotted ultrasonic block horn in accordance with an aspect of the present disclosure.

FIG. 2 shows an example of a large surface area ultrasonic block horn 201 having shaped element 200 in accordance with an aspect of the present disclosure having opposed ends 202, 204 and node 206 at a mid-point of shaped element 200. Ultrasonic block horn 201 is illustratively rectangular and illustratively square. The shaped element 200 is shaped as two back-to-back pyramids 208 joined together at truncated apexes 210 and each having a base 212. The base 212 of one of the pyramids 208 provides one of opposed ends 202, 204 and the base 212 of the other pyramid 208 provides the other opposed end 202, 204. Each pyramids 208 is illustratively a four sided pyramid having a square base 212, but can be other than a four sided pyramid and can have other than a square base. In an example, square base 212 of each pyramid 208 is 1.5 in. by 1.5 in. Shaped element 200 has a weld area (A) that is the area of the opposed end 202, 204 that is adjacent the booster of the ultrasonic stack. Where base 212 of each pyramid 208 is a 1.5 in. by 1.5 in square base, weld area (A) is 2.25 in². The area (a) is the area of the node 206 at the mid-point of shaped element 200, which is where apexes 210 meet. As discussed above, the ratio of (A)/(a) is at least 2. Thus in this example, the area (a) is no more than 1.125 in².

Figure 3:
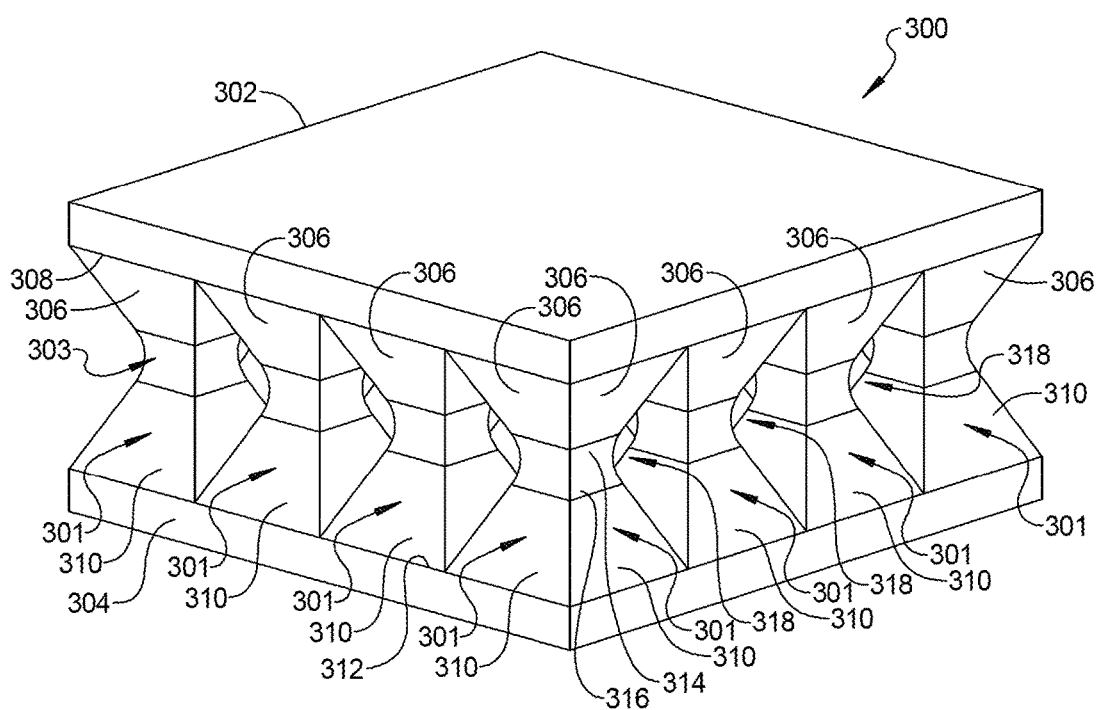
FIG. 3 is perspective view of a high bandwidth large surface area slotted ultrasonic block horn in accordance with an aspect of the present disclosure.
Figure 4:
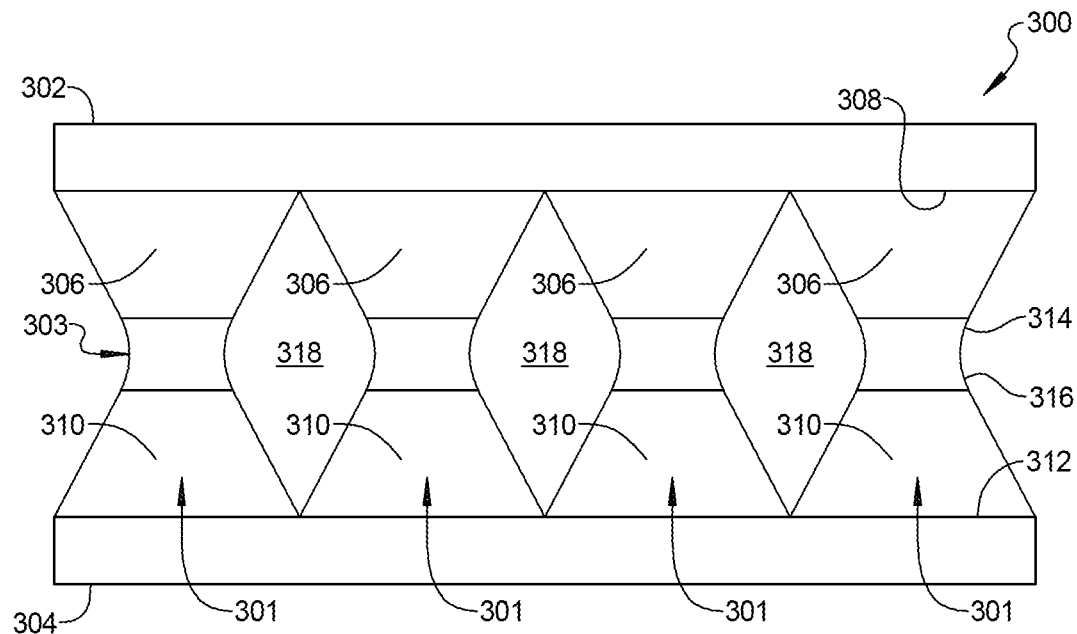
FIG. 4 is a side view of the high bandwidth large surface area slotted ultrasonic block horn of FIG. 2.

With reference to FIGS. 3 and 4, a rectangular high bandwidth large surface area slotted ultrasonic block horn 300 in accordance with an aspect of the present disclosure is shown. Horn 300 is formed with a 4×4 array of shaped elements 301 with each shaped element 301 having a node 303 at a mid-portion that is narrower than opposed ends of shaped element 301, as described below. Horn 300 includes a top plate 302 and a bottom plate 304. Top and bottom plates 302, 304 may illustratively be rectangular, and may be square. A plurality of pyramids 306 extend downwardly from a bottom 308 of top plate 302 and a plurality of corresponding pyramids 310 extend upwardly from a top 312 of bottom plate 304. Pyramids 306 and pyramids 310 meet at their respective apexes 314, 316, which are illustratively truncated and curve outwardly. Each pyramid pair 306, 310 provides one of the shaped elements 301. Pyramids 306, 310 may illustratively be four sided pyramids having square bases. Pyramids 306, 310 define slots 318 therebetween, which may illustratively have a back-to-back generally teardrop shape. Horn 300 may illustratively be made by three-dimensional metal printing in which fine layers of metal powder are successively melted on top of each other to print the desired structure. Horn 300 can thus be made with the above described structure by the use of three-dimensional metal printing and illustratively has a homogenous structure comparable to a cast structure. Horn 300 may illustratively be made of any metal than can be printed using a three dimensional printing process, such as stainless steels, carbon steels, tool steels, aluminum alloys, titanium allows, nickel-based alloys, cobalt-chromium alloys, and the like. It should be understood that pyramids 306, 310 could be other than four sided pyramids, such as three sided pyramids having triangular bases.

It should be understood that horn 300 could have one shaped element or an array of shaped elements other than a 4×4 array.

Figure 5:
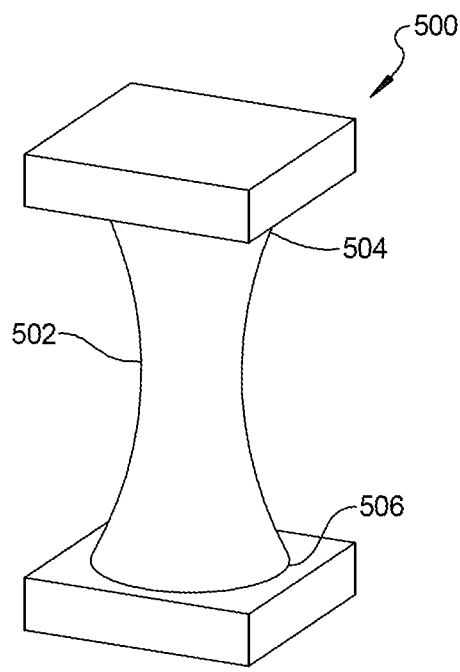
FIG. 5 is a perspective view of cylindrical shaped element for a high bandwidth large surface area slotted ultrasonic block horn in accordance with an aspect of the present disclosure.

It should also be understood that shapes other than pyramids joined at their truncated apexes could be used for the shaped elements, such as shaped element 200 or shaped elements 301. For example, FIG. 5 shows a shaped element 500 that is cylindrically shaped with the diameter of a node 502 at a mid-point of shaped element 500 less than a diameter of its opposed ends 504, 506.

FIG. 6 shows a cylindrical high bandwidth large surface area ultrasonic block horn 600 in accordance with an aspect of the present disclosure having a plurality of shaped elements 602. Each shaped element 602 has a node 604 at its mid-point that is narrower than opposed ends 606 of shaped element 602.

In accordance with an aspect of the present disclosure, a high bandwidth large surface area slotted ultrasonic block horn is formed of an array of the above described shaped elements having a narrower mid-portion than opposed ends. In an aspect, the array is a symmetrical array. In an aspect, the array is at least a 3×3 array. In an aspect, a high bandwidth large surface area slotted ultrasonic block horn has a 3×3 array of shaped elements 200 and has a weld surface area of at least 20.25 in$^2$ and in an illustrative aspect, the opposed ends of each shaped element 200 are 1.5 in. by 1.5 in. squares. In an aspect, each shaped element in each such array has an A/a ratio of at least 2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A large surface area ultrasonic block horn, comprising at least two shaped elements each having a node at a mid-point of the shaped element that is narrower than opposed ends of the shaped element,
wherein each shaped element has a ratio of (A)/(a) of at least two where (A) is a weld area of the shaped element and (a) is a cross-sectional area of the node wherein the weld area of the shaped element is an area of a base of the shaped element that is adjacent a booster of an ultrasonic stack when the ultrasonic block horn is attached to the booster.

2. The ultrasonic block horn of claim 1 wherein the ultrasonic block horn has a length or width that is at least one-half a wavelength of a nominal resonant frequency of the ultrasonic stack in which the ultrasonic block horn is intended to be used.

3. The ultrasonic block horn of claim 2 wherein each shaped element is shaped as back-to-back pyramids joined together at truncated apexes.

4. The ultrasonic block horn of claim 2 wherein each shaped element is cylindrically shaped having a diameter at its node at its mid-point between its opposed ends that is narrower than a diameter of its opposed ends.

5. The ultrasonic block horn of claim 2 wherein the ultrasonic block horn has an array of the shaped elements.

6. The ultrasonic block horn of claim 5 wherein the array of shaped elements is a 3×3 array.

7. The ultrasonic block horn of claim 5 wherein the array of shaped elements is a 4×4 array.

8. The ultrasonic block horn of claim 5 wherein the ultrasonic block horn is rectangular.

9. The ultrasonic block horn of claim 5 wherein the ultrasonic block horn is cylindrical.

10. The ultrasonic block horn of claim 1 wherein each shaped element is shaped as back-to-back pyramids joined together at truncated apexes.

11. The ultrasonic block horn of claim 1 wherein each shaped element is cylindrically shaped having a diameter at its node at its mid-point between its opposed ends that is narrower than a diameter of its opposed ends.

12. The ultrasonic block horn of claim 1 wherein the ultrasonic block horn has an array of the shaped elements.

13. The ultrasonic block horn of claim 12 wherein the array of shaped elements is a 3×3 array.

14. The ultrasonic block horn of claim 12 wherein the array of shaped elements is a 4×4 array.

15. The ultrasonic block horn of claim 12 wherein the ultrasonic block horn is rectangular.

16. The ultrasonic block horn of claim 12 wherein the ultrasonic block horn is cylindrical.

17. The ultrasonic block horn of claim 1 wherein each shaped element is symmetrical about its node.

* * * * *